United States Patent
Kim

(10) Patent No.: US 7,525,988 B2
(45) Date of Patent: Apr. 28, 2009

(54) METHOD AND SYSTEM FOR RATE SELECTION ALGORITHM TO MAXIMIZE THROUGHPUT IN CLOSED LOOP MULTIPLE INPUT MULTIPLE OUTPUT (MIMO) WIRELESS LOCAL AREA NETWORK (WLAN) SYSTEM

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 608 days.

(21) Appl. No.: 11/061,567

(22) Filed: Feb. 18, 2005

(65) Prior Publication Data
US 2006/0159120 A1 Jul. 20, 2006

Related U.S. Application Data

(60) Provisional application No. 60/593,473, filed on Jan. 17, 2005.

(51) Int. Cl.
H04B 1/00 (2006.01)
(52) U.S. Cl. .......................... 370/465; 455/69; 455/103
(58) Field of Classification Search .................. None
See application file for complete search history.

(56) References Cited

U.S. PATENT DOCUMENTS

| 5,070,536 | A | 12/1991 | Mahany et al. | |
|---|---|---|---|---|
| 5,425,051 | A | 6/1995 | Mahany | |
| 6,754,475 | B1 * | 6/2004 | Harrison et al. | 455/115.1 |
| 7,181,167 | B2 * | 2/2007 | Onggosanusi et al. | 455/63.1 |
| 2003/0035491 | A1 | 2/2003 | Walton et al. | |
| 2004/0082356 | A1 | 4/2004 | Walton | |
| 2004/0120411 | A1 * | 6/2004 | Walton et al. | 375/260 |

FOREIGN PATENT DOCUMENTS

| EP | 1207645 A | 5/2002 |
|---|---|---|
| WO | 02093784 A | 11/2002 |
| WO | 03041300 A | 5/2003 |

OTHER PUBLICATIONS

Hara et al., "Throughput Enhancement for MIMO-OFDM Systems Using Transmission Control and Adaptive Modulation", Proc. WPMC'04. [Online] Sep. 2004, pp. 1-5, XP002362557.
Suto et al., "Throughput Maximization Transmission Control Scheme for MIMO systems", Vehicular Technology Conference, 2004, VTC 2004-Spring, 2004 IEEE 59th, vol. 2, pp. 603-607.

* cited by examiner

Primary Examiner—Chirag G Shah
Assistant Examiner—Otis L Thompson, Jr.
(74) Attorney, Agent, or Firm—McAndrews, Held & Malloy, Ltd

(57) ABSTRACT

Aspects of a method and system for rate selection algorithm to maximize throughput in closed loop multiple input multiple output (MIMO) wireless local area network (WLAN) system are provided and may comprise computing a maximum number of binary bits to be simultaneously transmitted via an RF channel based on signal quality. A modulation technique may be selected based on the computed maximum, communicating feedback information comprising the selected modulation technique. Subsequently transmitted data may be received via an RF channel which is modulated based on the feedback information. Another aspect of the method may comprise receiving feedback information comprising at least one of a selected modulation technique and coding rate via an RF channel, and transmitting subsequent data via said at least one of a plurality of RF channels which either modulated, or coded, based on the feedback information.

22 Claims, 10 Drawing Sheets

METHOD AND SYSTEM FOR RATE SELECTION ALGORITHM TO MAXIMIZE THROUGHPUT IN CLOSED LOOP MULTIPLE INPUT MULTIPLE OUTPUT (MIMO) WIRELESS LOCAL AREA NETWORK (WLAN) SYSTEM

CROSS-REFERENCE TO RELATED APPLICATIONS/INCORPORATION BY REFERENCE

This application makes reference to:
U.S. patent application Ser. No. 11/052,389 filed Feb. 7, 2005; and
U.S. patent application Ser. No. 11/052,353 filed Feb. 7, 2005.

All of the above stated applications are hereby incorporated herein by reference in their entirety.

FIELD OF THE INVENTION

Certain embodiments of the invention relate to wireless communication. More specifically, certain embodiments of the invention relate to a method and system for a rate selection algorithm to maximize throughput in a closed loop multiple input multiple output (MIMO) wireless local area network (WLAN) system.

BACKGROUND OF THE INVENTION

The Institute for Electrical and Electronics Engineers (IEEE), in resolution IEEE 802.11, also referred as 802.11, has defined a plurality of specifications which are related to wireless networking. With current existing 802.11 standards, such as 802.11(a),(b),(g), which can support up to 54 Mbps data rates, either in 2.4 GHz or in 5 GHz frequency bands, the IEEE standards body created a new task group, 802.11n, to support higher than 100 Mbps data rates. Among them being discussed are specifications for closed loop feedback mechanisms by which a receiving station may feed back information to a transmitting station to assist the transmitting station in adapting signals, which are sent to the receiving station. In closed loop feedback systems, a transmitting station may utilize feedback information from a receiving station to transmit subsequent signals in what is called beamforming. Beamforming is a technique to steer signals to a certain direction for the receiver to receive it more reliably with less noise and interference. Compounded with demands for new features and capabilities, various proposals for new 802.11n based feedback mechanisms are emerging to address the demand for these new features and capabilities. For example, there exists a demand for the introduction of new capabilities, which may enable a receiving mobile terminal to feedback pertinent information to a transmitting mobile terminal. This feedback of pertinent information may enable the transmitting mobile terminal to adapt its mode of transmission based upon the feedback information provided by the receiving mobile terminal. As with any communication system, a major goal is to enable the transmitting mobile station to achieve a higher information transfer rate to the receiving mobile terminal, while simultaneously achieving a lower packet error rate (PER). Notwithstanding, there are no existing methodologies that adequately address these shortcomings and the demand for these new features and capabilities in WLANs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system to increase throughput in closed loop multiple input multiple output (MIMO) wireless local area network (WLAN) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a rate selection algorithm to maximize throughput in a closed loop multiple input multiple output (MIMO) wireless local area network (WLAN) system, which utilizes either adaptive modulation, or adaptive modulation and coding in a closed loop system.

In accordance with an embodiment of the invention, with regard to channel information, MIMO systems may utilize the channel more efficiently. For example, RF channels that are characterized by higher signal to noise ratios (SNR) may support higher data transfer rates than RF channels with lower SNR. Eigen beamforming, or beamforming, may be utilized with systems that support the exchange of feedback information from a receiver to a transmitter (or closed loop systems) to steer beams which may enable signal energy to be focused in a desired direction. Any of a plurality of RF channels which may be utilized by a transmitter to communicate with a receiver may be referred to as downlink channels, while any of a plurality of RF channels which may be utilized by a receiver to communicate with a transmitter may be referred to as uplink channels.

Adaptive modulation and coding rate techniques may be utilized with beamforming techniques such that a plurality of signals, or streams, may be transmitted simultaneously that comprise different amounts of data. The modulation and/or coding rate may be chosen per stream efficiently, with either or both capable of being modified, based on channel information. In one aspect of the invention, modulation and/or coding schemes may be selected on a per-stream basis to maximize the aggregate information transfer rate while minimizing packet error rates (PER) for information transmitted simultaneously via a plurality of RF channels. For example, this may entail evaluating the SNR performance of individual RF channels, and adapting the modulation and/or coding scheme for each RF channel based on the SNR performance, and data rate maximization criteria. Exemplary measures of signal quality may comprise, for example, SNR and PER.

Figure 1:
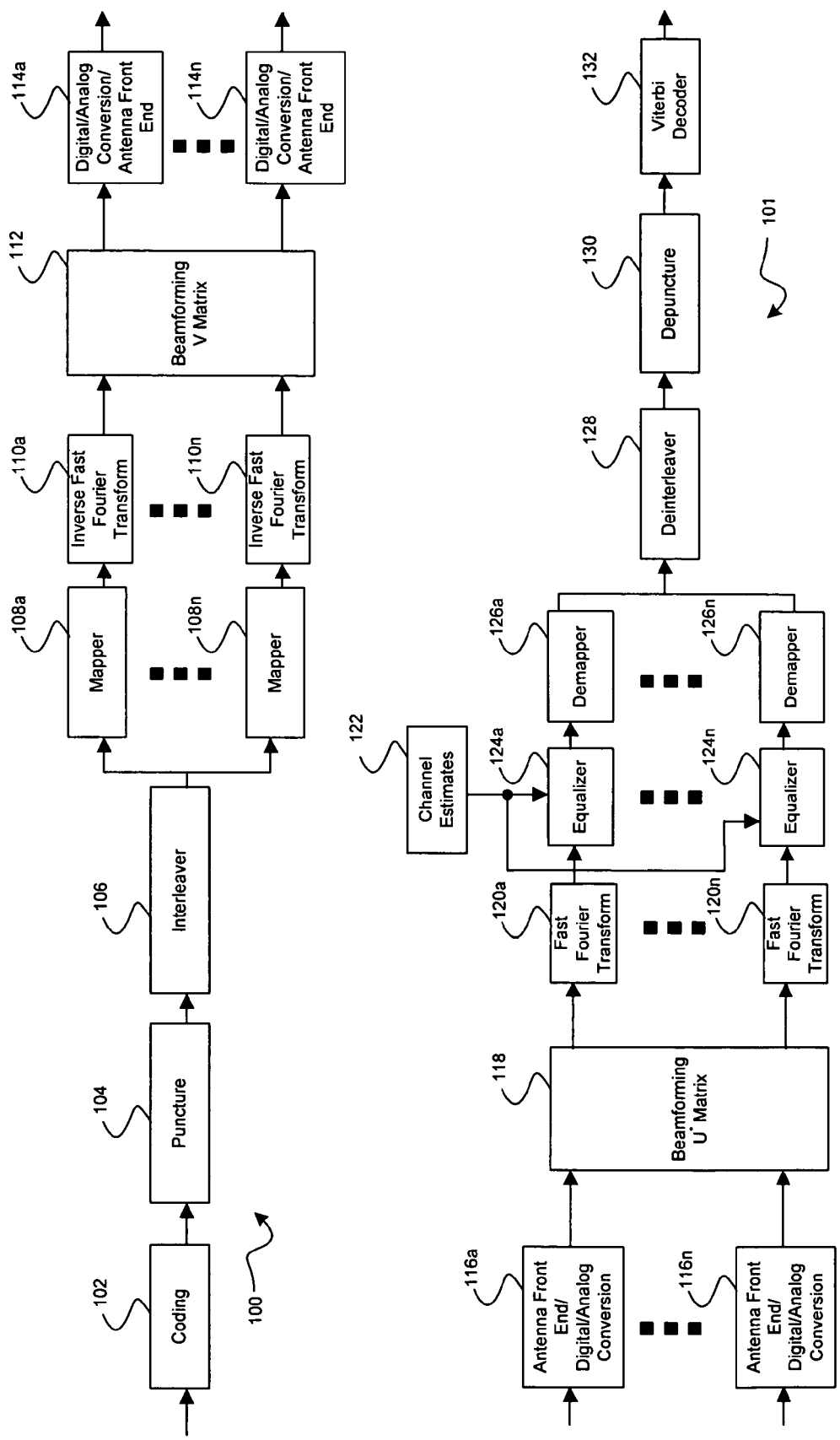
FIG. 1 is an exemplary block diagram of a transmitter and a receiver in a MIMO system, in accordance with an embodiment of the invention.

FIG. 1 is an exemplary block diagram of a transmitter and a receiver in a MIMO system, in accordance with an embodiment of the invention. With reference to FIG. 1 there is shown a transmitter 100 and a receiver 101. The transmitter 100 may comprise a coding block 102, a puncture block 104, an interleaver block 106, a plurality of mapper blocks 108a, . . . , 108n, a plurality of inverse fast Fourier transform (IFFT) blocks 110a, . . . , 110n, a beamforming V matrix block 112, and a plurality of digital to analog (D/A) conversion and antenna front end blocks 114a, . . . , 114n. The receiver 101 may comprise a plurality of antenna front end and analog to digital (A/D) conversion blocks 116a, . . . , 116n, a beamforming U* matrix block 118, a plurality of fast Fourier transform (FFT) blocks 120a, . . . , 120n, a channel estimates block 122, a plurality of equalizer blocks 124a, . . . , 124n, a plurality of demapper blocks 126a, . . . , 126n, a deinterleaver block 128, a depuncture block 130, and a Viterbi decoder block 132.

The matrices V and U* in the beamforming blocks 112 and 118 respectively refer to matrices utilized in the beamforming technique. U.S. application Ser. No. 11/052,389 filed Feb. 7, 2005, provides a detailed description of Eigen beamforming and is hereby incorporated herein by reference in its entirety.

In the transmitter 100, the coding block 102 may transform received binary input data blocks by applying a forward error correction (FEC) technique such as, for example, binary convolutional coding (BCC). The application of channel coding techniques such as FEC may improve the ability to successfully recover transmitted data at a receiver by appending redundant information to the input data prior to transmission via an RF channel. The ratio of the number of bits in the binary input data block to the number of bits in the transformed data block may be known as the coding rate. The coding rate may be specified using the notion, $i_b/t_b$, where $t_b$ represents the total number of bits which comprise a coding group of bits, while $i_b$ represents the number of information bits that are contained in the group of bits $t_b$. Any number of bits $(t_b-i_b)$ may represent redundant bits which may enable the receiver 101 to detect and correct errors introduced during transmission. Increasing the number of redundant bits may enhance the capabilities at the receiver to detect and correct errors in information bits.

The puncture block 104 may receive transformed binary input data blocks from the coding block 102 and alter the coding rate by removing redundant bits from the received transformed binary input data blocks For example, if the coding block 102 implemented a ½ coding rate, 4 bits of data received from the coding block 102 may comprise 2 information bits, and 2 redundant bits. By eliminating 1 of the redundant bits in the group of 4 bits, the puncture block 104 may adapt the coding rate from ½ to ⅔. The interleaver block 106 may rearrange bits received in a coding rate-adapted data block from the puncture block 104 prior to transmission via an RF channel to reduce the probability of uncorrectable corruption of data due to burst of errors, impacting contiguous bits, during transmission via an RF channel. The output from the interleaver block 106 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 106, $n_{st}$, and a given number of bits assigned to an individual stream i by the interleaver block 106, $b_{st}(i)$:

$$b_{db} = \sum_{i=1}^{n_{st}} b_{st}(i) \quad \text{equation [1]}$$

The plurality of mapper blocks 108a, . . . , 108n may comprise a number of individual mapper blocks which is equal to the number of individual streams generated by the interleaver block 106. Each individual mapper block 108a, . . . , 108n may receive a plurality of bits from a corresponding individual stream, mapping those bits into a symbol by applying a modulation technique based on a constellation utilized to transform the plurality of bits into a signal level representing the symbol. The representation of the symbol may be a complex quantity comprising in-phase (I) and quadrature (Q) components. The mapper block 108a, . . . , 108n for stream i may utilize a modulation technique to map a plurality of bits, $b_{st}(i)$, into a symbol.

The plurality of IFFT blocks 110a, . . . , 110n may receive symbols from the plurality of mapper blocks 108a, . . . , 108n where each IFFT block, such as 110a, may receive a symbol from a corresponding mapper block, such as 108a. Each IFFT block 110a, . . . , 110n may subdivide the bandwidth of the RF channel into a plurality of n sub-band frequencies to implement orthogonal frequency division multiplexing (OFDM), buffering a plurality of received symbols equal to the number of sub-bands. Each buffered symbol may be modulated by a carrier signal whose frequency is based on one of the sub-bands. Each of the IFFT blocks 110a, . . . , 110n may then independently sum their respective buffered and modulated symbols across the frequency sub-bands to perform an n-point IFFT thereby generating a composite OFDM signal.

The beamforming V matrix block 112 may apply the beamforming technique to the plurality of composite OFDM signals, or spatial modes, generated from the plurality of IFFT blocks 110a, . . . , 110n. The beamforming V matrix block 112 may generate a plurality of signals where the number of signals generated may be equal to the number of transmitting antenna at the transmitter 100. Each of the plurality of signals generated by the beamforming V block 112 may comprise a weighted sum of at least one of the received composite OFDM signals from the IFFT blocks 110a, . . . , 110n. The plurality of D to A conversion and antenna front end blocks 114a, . . . , 114n may receive the plurality of signals generated by the beamforming V matrix block 112, and convert the digital signal representation received from the beamforming V matrix block 112 to an analog RF signal which may be amplified and transmitted via an antenna. The plurality of D to A conversion and antenna front end blocks 114a, . . . , 114n may be equal to the number of transmitting antenna at the transmitter 100. Each D to A conversion and antenna front end block 114a, . . . , 114n may receive one of the plurality of signals from the beamforming V matrix block 112 and may utilize an antenna to transmit one RF signal via an RF channel.

In the receiver 101, the plurality antenna front end and A to D conversion blocks 116a, . . . , 116n may receive analog RF signals via an antenna, converting the RF signal to baseband and generating a digital equivalent of the received analog baseband signal. The digital representation may be a complex quantity comprising I and Q components. The number of antenna front end and A and D conversion blocks 116a, . . . , 116n may be equal to the number of receiving antenna at the receiver 101. The beamforming U* block 118 may apply the beamforming technique to the plurality of digital signals received from the plurality of antenna front end and A and D conversion blocks 116a, . . . , 116n. The beamforming U* block 118 may generate a plurality of signals where the number of signals generated may be equal to the number of streams utilized in generating the signals at the transmitter 100. Each signal in the plurality generated by the beamforming U* block 118 may comprise a weighted sum of at least one of the digital signals received from the antenna front end and A to D conversion blocks 116a, . . . , 116n. The plurality of FFT blocks 120a, . . . , 120n may receive a plurality of signals, or spatial modes, from the beamforming U* block 118. The plurality of FFT blocks 120a, . . . , 120n may be equal to the number of signals generated by the beamforming U* block 118. Each FFT block 120a, . . . , 120n may receive a signal from the beamforming U* block 118, independently applying an n-point FFT technique, demodulating the signal by a plurality of carrier signals based on the n sub-band frequencies utilized in the transmitter 100. The demodulated signals may be mathematically integrated over one sub band frequency period by each of the plurality of FFT blocks 120a, . . . , 120n to extract the n symbols contained in each of the plurality of OFDM signals received by the receiver 101.

The channel estimates block 122 may utilize preamble information contained in a received RF signal to compute channel estimates. The plurality of equalizer blocks 124a, . . . , 124n may receive symbols generated by the plurality of FFT blocks 120a, . . . , 120n. The plurality of equalizer blocks 124a, . . . , 124n may be equal to the number of FFT blocks 120a, . . . , 120n. Each of the equalizer blocks 124a, . . . , 124n may receive a signal from one of the FFT blocks 120a, . . . , 120n, independently processing the signal based on input from the channel estimates block 122 to recover the symbol originally generated by the transmitter 100. Each equalizer block 124a, . . . , 124n may comprise suitable logic, circuitry, and/or code that may be adapted to transform symbols received from an FFT block 120a, . . . , 120n to compensate for fading in the RF channel. The plurality of demapper blocks 126a, . . . , 126n may receive symbols from the plurality of equalizer blocks 124a, . . . , 124n. Each in the plurality of demapper blocks 126a, . . . , 126n may reverse map each symbol to a plurality of bits by applying a demodulation technique, based on the modulation technique utilized in generating the symbol at the transmitter 100, to transform the symbol into a plurality of bits. The plurality of demapper blocks 126a, . . . , 126n may be equal to the number of equalizer blocks 124a, . . . , 124n, which may also be equal to the number of streams in the transmitter 100.

The deinterleaver block 128 may receive a plurality of bits from each of the demapper blocks 126a, . . . , 126n, rearranging the order of bits among the received plurality of bits. The deinterleaver block 128 may rearrange the order of bits from the plurality of demapper blocks 126a, . . . , 126n in, for example, the reverse order of that utilized by the interleaver 106 in the transmitter 100. The depuncture block 130 may insert null bits into the output data block received from the deinterleaver block 128 that were removed by the puncture block 104. The Viterbi decoder block 132 may decode a depunctured output data block, applying a decoding technique which may recover the binary data blocks that were input to the coding block 102.

Figure 2:
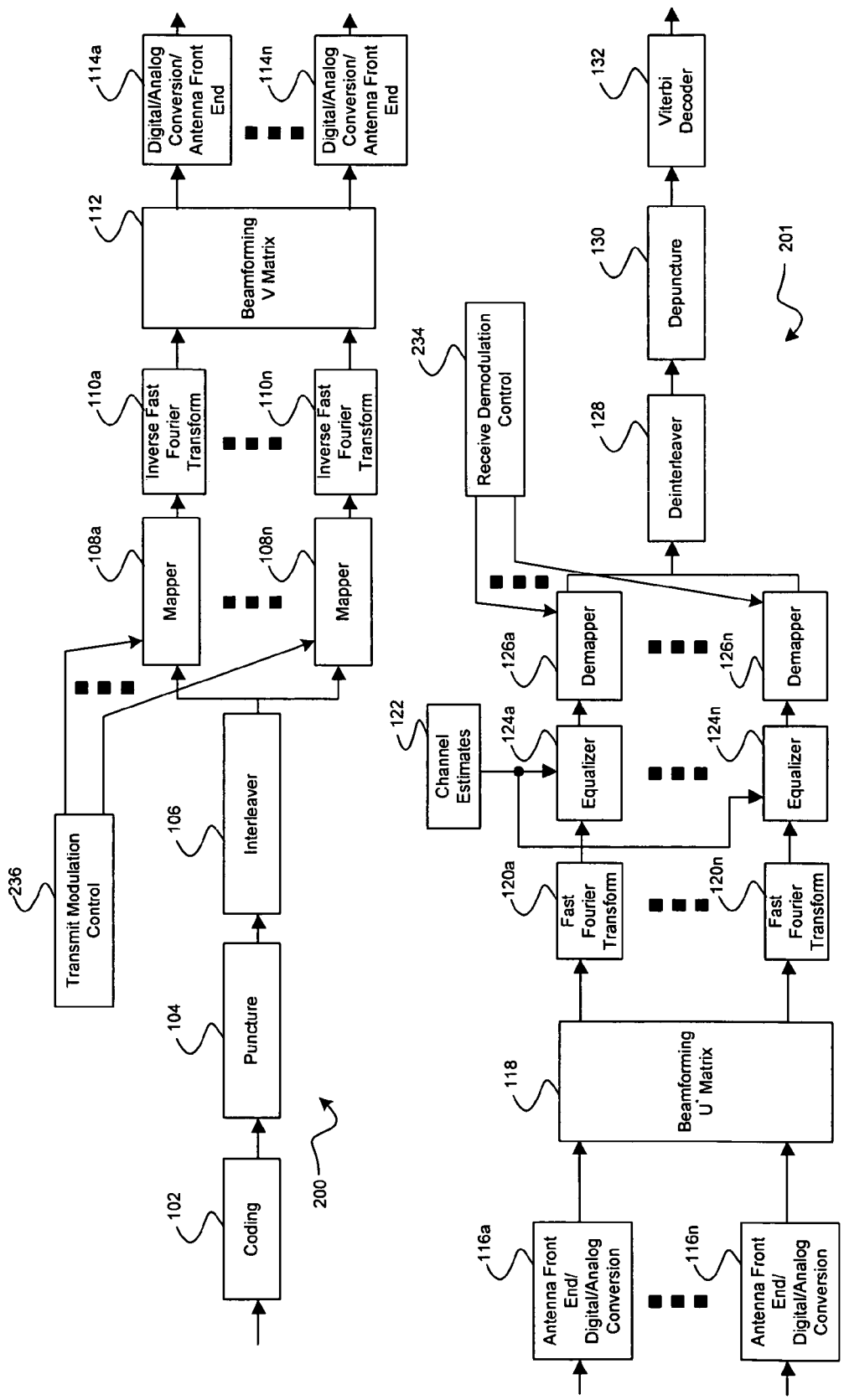
FIG. 2 is an exemplary block diagram of a transmitter with adaptive modulation and a corresponding receiver with adaptive demodulation for a MIMO system, in accordance with an embodiment of the invention.

FIG. 2 is an exemplary block diagram of a transmitter with adaptive modulation and a corresponding receiver with adaptive demodulation for a MIMO system, in accordance with an embodiment of the invention. With reference to FIG. 2 there is shown a transmitter 200, and a receiver 201. The transmitter 200 may comprise a transmit modulation control block 236, and a plurality of blocks as shown in the transmitter 100 (FIG. 1), the coding block 102, the puncture block 104, the interleaver block 106, the plurality of mapper blocks 108a, . . . , 108n, the plurality of IFFT blocks 110a, . . . , 110n, the beamforming V matrix block 112, and the plurality of digital to analog conversion and antenna front end blocks 114a, . . . , 114n. The receiver 201 may comprise a receive demodulation control block 234, and a plurality of blocks as shown in the receiver 101 (FIG. 1), the plurality of antenna front end and digital to analog conversion blocks 116a, . . . , 116n, the beamforming U* matrix block 118, the plurality of FFT blocks 120a, . . . , 120n, the channel estimates block 122, the plurality of equalizer blocks 124a, . . . , 124n, the plurality of demapper blocks 126a, . . . , 126n, the deinterleaver block 128, the depuncture block 130, and the Viterbi decoder block 132. The transmit modulation control block 236 may enable control over the selection of modulation techniques utilized in the transmitter 200. The receive demodulation control block 234 may enable control over the selection of demodulation techniques utilized in the receiver 201. In operation, the transmit modulation control block 236 may enable control of modulation techniques applied by each of the plurality of mapper blocks 108a . . . 108n individually, on a per-stream basis. The receive demodulation control block 234 may enable control of demodulation techniques applied by each of the plurality of demapper blocks 126a, . . . , 126n individually, on a per-stream basis.

In operation, per-stream control of the mapper blocks 108a, . . . , 108n may control the number of bits assigned to one or more individual streams, $b_{st}(i)$, to ensure that the sum of bits across the plurality of streams equals the aggregate number of bits in the coding rate-adapted data block, $b_{db}$, as shown in equation [1].

Figure 3:
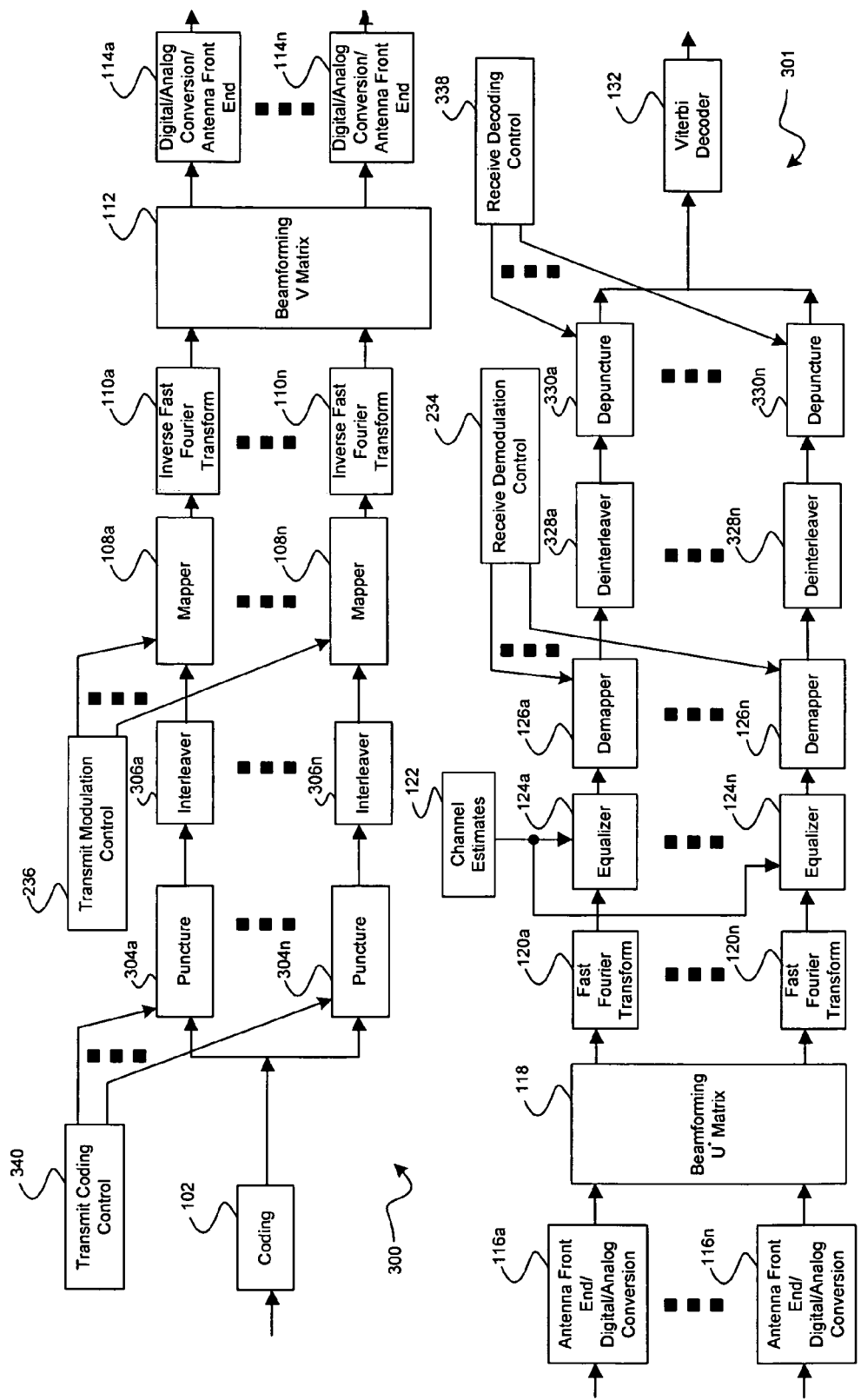
FIG. 3 is an exemplary block diagram of a transmitter with adaptive modulation and coding, and a corresponding receiver with adaptive demodulation and decoding for a MIMO system, in accordance with an embodiment of the invention.

FIG. 3 is an exemplary block diagram of a transmitter with adaptive modulation and coding, and a corresponding receiver with adaptive demodulation and decoding for a MIMO system, in accordance with an embodiment of the invention. With reference to FIG. 3 there is shown a transmitter 300, and a receiver 301. The transmitter 300 may comprise a plurality of puncture blocks 304a, . . . , 304n, a plurality of interleaver blocks 306a, . . . , 306n, a transmit coding control block 340, and a plurality of blocks as shown in the transmitter 200 (FIG. 2), the coding block 102, the puncture block 104, the interleaver block 106, the plurality of mapper blocks 108a, . . . , 108n, the plurality of IFFT blocks 110a, . . . , 110n, the beamforming V matrix block 112, and the plurality of digital to analog conversion and antenna front end blocks 114a, ..., 114n, and the transmit modulation control block 236. The receiver 301 may comprise a plurality of deinterleaver blocks 328a, ..., 328n, a plurality of depuncture blocks 330a, ..., 330n, a receive coding control block 338, and a plurality of blocks as shown in the receiver 201 (FIG. 2), the plurality of antenna front end and digital to analog conversion blocks 116a, ..., 116n, the beamforming U* matrix block 118, the plurality of FFT blocks 120a, ..., 120n, the channel estimates block 122, the plurality of equalizer blocks 124a, ..., 124n, the plurality of demapper blocks 126a, ..., 126n, the deinterleaver block 128, the depuncture block 130, and the Viterbi decoder block 132, and the receive demodulation control block 234.

In the transmitter 300, puncture and interleaving may be performed individually on a per-stream basis. The output from the plurality of puncture blocks 304a, ..., 304n may be communicated to the plurality of interleaver blocks 306a, ..., 306n. Each puncture block in the plurality 304a, ..., 304n may communicate its output to a corresponding one of the plurality of interleaver blocks 306a, ..., 306n. The output from the plurality of interleaver blocks 306a, ..., 306n may be communicated to the plurality of mapper blocks 108a, ..., 108n. Each of the plurality of interleaver blocks 306a, ..., 306n may communicate its output to a corresponding one of the plurality of mapper blocks 108a, ..., 108n. The transmit coding control block 340 may enable control over the application of puncture utilized in the transmitter 300.

In the receiver 301, depuncture and deinterleaving may be performed individually on a per-stream basis. Each deinterleaver block 328a, ..., 328n may receive input from a plurality of demapper blocks 126a, ..., 126n with each deinterleaver block in the plurality 328a, ..., 328n receiving input from a corresponding one of the plurality of demapper blocks 126a, ..., 126n. Each depuncture block 330a, ..., 330n may receive input from a plurality of deinterleaver blocks 328a, ..., 328n with each depuncture block in the plurality 330a, ..., 330n receiving input from a corresponding one of the plurality of deinterleaver blocks 328a, ..., 328n. The output from each of the plurality of depuncture blocks 330a, ..., 330n may be communicated to the Viterbi decoder block 132. The receive decoding control block 338 may enable control over the application of depuncture utilized in the receiver 301.

In operation, the transmit coding control block 340 may enable control of puncture applied by each of the plurality of puncture blocks 304a, ..., 304n individually, on a per-stream basis. The per-stream control of puncture may enable the coding rate to vary on a per-stream basis. The receive coding control block 338 may enable control of depuncture applied by each of the plurality of depuncture blocks 330a, ..., 330n individually, on a per-stream basis. The per-stream control of depuncture may enable the receiver 301 to adapt to differences in the coding rate of the received signal on a per-stream basis.

The ability for a transmitter 200 or 300 and a receiver 201 or 301 to coordinate modulation/demodulation control and/or coding/decoding may require closed loop feedback mechanisms, which enable information exchange between a transmitter 200 or 300 and a receiver 201 or 301. U.S. application Ser. No. 11/052,353 filed Feb. 7, 2005, provides a detailed description of closed loop feedback mechanisms, and is hereby incorporated herein by reference in its entirety.

In an embodiment of the invention, maximizing the aggregate data rate via a plurality of RF channels from a transmitter 200 may be achieved via adaptive modulation on a per-stream basis where the coding rate is the same for all streams. This may comprise assigning individual values, $b_{st}(i)$, for each stream i to maximize the number of data block bits, $b_{db}$, which may be transmitted per unit of time while achieving a target packet error rate (PER).

In another embodiment of the invention, maximizing the aggregate data rate via a plurality of RF channels from a transmitter 300 may be achieved via adaptive modulation on a per-stream basis and adaptive coding on a per-stream basis. This may comprise assigning individual values, $b_{st}(i)$, for each stream i, and assigning coding rates for each steam to modify the number of information bits, $i_b(i)$ on a per-stream basis. Per-stream control of coding rates in addition to modulation rates may provide another variable which may be utilized to maximize the number of data block bits, $b_{db}$, which may be transmitted per unit of time while achieving a PER.

Various embodiments of the invention which may incorporate closed loop feedback mechanisms may adaptively modify coding rates and/or modulation technique in response to RF channel fading.

In an exemplary embodiment of the invention in which aggregate data rates may be maximized utilizing per-stream modulation control and demodulation control, a two step process, for example, may be followed. In the first step, bit assignments, $b_{st}(i)$, may be computed based on SNR values. This may produce graphs indicating a frontier of possible values of $b_{st}(i)$ for ranges of values of SNR. In a second exemplary step, a specific value, $b_{st}(i)$, may be selected based on an observed SNR and an observed PER.

In operation, symbols may be transmitted utilizing a plurality of tones via an RF channel, where each tone may be transmitted at a frequency selected from a range of frequencies. Each tone, for example, may represent an OFDM subband frequency. In a channel characterized by frequency selective fading, the SNR in a given RF channel, j, may vary by a frequency such that a tone sent at frequency $f_1$ may have an $SNR_{f1}$ which is different from the SNR for a tone sent at a different frequency $f_2$, $SNR_{f2}$. An aggregate SNR may be determined for a spatial mode by computing a geometric mean SNR based upon the plurality of individual $SNR_{fj}$ from among the frequencies $f_j$ which may be transmitted via an RF channel. The aggregate geometric SNR across the plurality of frequencies, which may be referred to as $SNR_{geo}$, may be expressed as in the following equation:

$$SNR_{geo} = \sqrt[k]{\prod_{f_j=1}^{k} SNR_{f_j}}, \text{ where} \qquad \text{equation [2]}$$

k may be equal to the number of tones which may be sent via an RF channel, Π represents the multiplicative product of the SNRs for individual tones, and the expression in equation [2] may refer to the aggregate geometric SNR being equal to the $k^{th}$ root of the product individual SNRs from each of the k tones.

A geometric SNR may be determined for each spatial mode i, $SNR_{geo}(i)$. Upon determining each of the $SNR_{geo}(i)$, an algorithm such as, for example, the Aslanis formula may be used to determine a bit assignment among the spatial modes. For the $i^{th}$ stream, or spatial mode, the bit assignment, $b_{st}(i)$, may be calculated by the Aslanis formula as in the following equation:

$$b_{st}(i) = \max(\text{floor}(\log_2(1 + SNR_{geo}(i)/\Gamma_i)/2) \times 2, 1), \text{ where} \qquad \text{equation [3]}$$

the expression in equation [3] computes a base 2 logarithm for the geometric SNR, the function floor(x) may represent the integer portion of x, the maximum function max(x,y) may represent the larger value between x and y, and $\Gamma_i$ may represent impairments in the RF channel associated with the $i^{th}$ spatial mode. The value $\Gamma_i=1$ may indicate an RF channel without impairments while $\Gamma_i>1$ may indicate impairments in the RF channel.

In operation, each value, $b_{st}(i)$, may be computed as in, for example, equation [3] based on observable performance criteria, such as for example, PER. The plurality of values $b_{st}(i)$ may produce a value $b_{db}$ as in, for example, equation [1] which may represent a maximum data transfer rate between a transmitter 200 (FIG. 2) and a receiver 201 (FIG. 2).

Embodiments of the invention may utilize a plurality of modulation techniques such as, for example, binary phase shift keying (BPSK), quadrature phase shift keying (QPSK), 16 level quadrature amplitude modulation (16 QAM), 64 level QAM (64 QAM), and 256 level QAM (256 QAM) Symbols generated utilizing the BPSK modulation technique may represent 1 bit per symbol, symbols generated utilizing the QPSK modulation technique may represent 2 bits per symbol, and symbols generated utilizing the 16 QAM modulation technique may represent 4 bits per symbol. When utilizing the 64 QAM modulation technique, symbols generated may represent 6 bits per symbol, and the 256 QAM modulation technique may generate symbols which represent 8 bits.

In an exemplary embodiment of the invention in which aggregate data rates may be maximized utilizing per-stream modulation control and demodulation control and per-stream coding control and decoding control, a four step process, for example, may be followed. In the first exemplary step, bit assignments, $b_{st}(i)$, may be computed based on values of SNR. This may produce graphs indicating a frontier of possible values of $b_{st}(i)$ for ranges of values of SNR. In a second exemplary step, for each value $b_{st}(i)$, a range of possible coding rate values may be computed. In a third exemplary step, a look up table may be computed representing possible coding rate and modulation scheme combinations for given SNR ranges. In a fourth exemplary step, specific values for modulation, $b_{st}(i)$, and coding rate, $i_b(i)/b_{st}(i)$, may be selected based on an observed SNR and an observed PER. There may be a plurality of modulation and coding rate combinations that achieve an observed SNR and an observed PER, in which case a combination may be selected that results in the maximum $i_b(i)$ being transmitted per unit of time.

In an exemplary embodiment of the invention in which aggregate data rates may be maximized utilizing per-stream modulation control and demodulation control and per-stream coding control and decoding control, a lookup table, Mod_Coding_LUT, for example, may be utilized to chose the modulation scheme and coding rates. An exemplary lookup table, Mod_Coding_LUT, for a spatial mode i may be represented as follows:

$$\text{Mod\_Coding\_LUT} = [1/2\ 1\ 4/3\ 2\ 8/3\ 3\ 4\ 9/2\ 16/3\ 6\ 20/3; \ldots$$
$$2\ 5\ 8\ 11\ 15\ 16\ 20\ 22\ 24\ 27\ 30; \ldots$$
$$1\ 2\ 2\ 4\ 4\ 4\ 6\ 6\ 8\ 8\ 8; \ldots$$
$$1/2\ 1/2\ 2/3\ 1/2\ 2/3\ 3/4$$
$$2/3\ 3/4\ 2/3\ 3/4\ 5/6;];$$

equation [4]

where, the elements in the first row may represent the product of the bits/tone, and coding rate elements in corresponding columns, the elements in the second row may represent the SNR ranges, the elements in the third row may represent the modulation schemes for stream i (bits/tone), and the elements in the fourth row may represent the coding rate for stream i. The product of modulation (bits/tone) and coding rate may represent the number of information bits $i_b(i)$.

Referring to Mod_Coding_LUT of equation [4] indicates that data transfer rates may increase with increasing SNR. For example, with a given SNR of 5 dB, the Mod_Coding_LUT may indicate that each symbol comprise 2 bits with a coding rate of ½. The QPSK modulation technique may be utilized to generate a symbol which comprises 2 bits. The product, modulation×coding_rate, may equal 1, indicating that each transmitted tone may communicate 1 information bit. For a given SNR of 27, the Mod_Coding_LUT may, for example, indicate that each symbol comprise 8 bits with a coding rate of ¾. In this case, the product, modulation×coding_rate, may equal 6, indicating that each transmitted tone may communicate 6 information bits.

As also shown in the Mod_Coding_LUT of equation [4], adaptation may comprise modification of both the modulation technique and coding rate, modification of the modulation technique alone, or modification of the coding rate alone. An alternative to a tabular representation as shown in equation [4], for example, the adaptive modulation and coding criteria may also be represented in a graph based on observed data.

Figure 4:
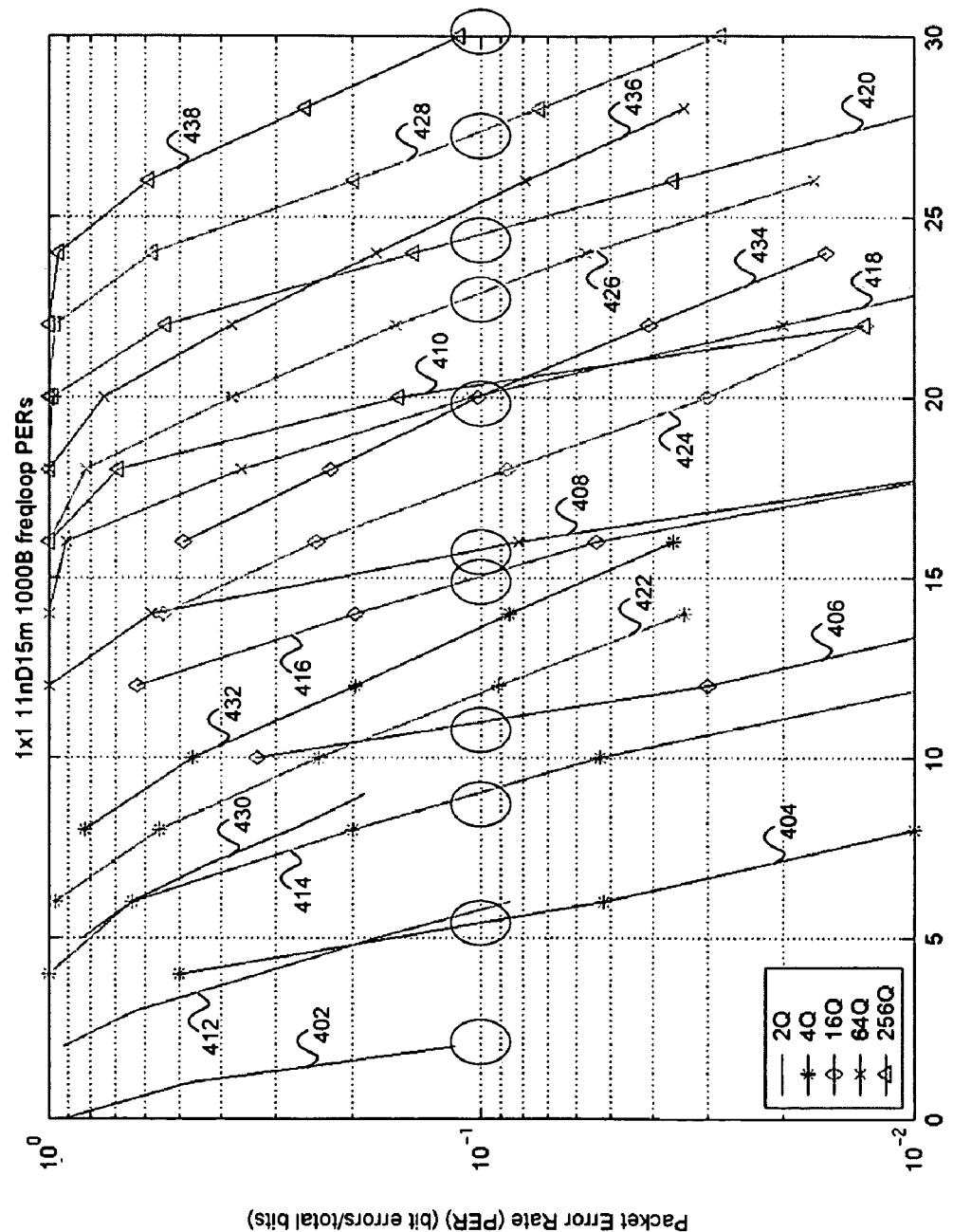
FIG. 4 is a graph illustrating exemplary packet error rates (PER) versus signal to noise ratio (SNR) for a 1×1 system, in accordance with an embodiment of the invention.

FIG. 4 is a graph illustrating exemplary packet error rates (PER) versus signal to noise ratio (SNR) for a 1×1 system, in accordance with an embodiment of the invention. A transmitter with N transmitting antenna, and a receiver with N receiving antenna which each utilize Eigen beamforming may be equivalent to a 1×1 system without interference. For example, the 1×1 system may be equivalent to one in which stream 1 was transmitted via antenna 1 at the transmitter, stream 2 transmitted via antenna 2 . . . stream N transmitted via antenna N. At the receiver, transmitted stream 1 may be received via antenna 1 at the receiver with no interference from transmitted streams 2 . . . N. Similarly, transmitted stream 2 may be received via antenna 2 at the receiver with no interference from transmitted stream 1, or streams 3 . . . N, and so forth. With reference to FIG. 4 is shown graph 402, graph 404, graph 406, graph 408, graph 410, graph 412, graph 414, graph 416, graph 418, graph 420, graph 422, graph 424, graph 426, graph 428, graph 430, graph 432, graph 434, graph 436, and graph 438. Testing conditions for the graphs in FIG. 4 may be based, for example, on an IEEE 802.11 type D channel, with a distance of about 15 meters between the transmitting antenna and the receiving antenna. Data packets may comprise 1,000 octets of binary data with PERs measured over a frequency loop that comprises a plurality of IEEE resolution 802.11 RF channels.

Graph 402 shows an exemplary graph of PER versus SNR for BPSK modulation and a coding rate of ½, for which the product, modulation×coding_rate, may be ½, indicating that 1 information bit may be transmitted for every two symbols transmitted. Graph 404 shows an exemplary graph of PER versus SNR for QPSK modulation and a coding rate of ½, for which the product, modulation×coding_rate, may be 1. Graph 406 shows an exemplary graph of PER versus SNR for 16 QAM modulation and a coding rate of ½, for which the product, modulation×coding_rate, may be 2. Graph 408 shows an exemplary graph of PER versus SNR for 64 QAM modulation and a coding rate of ½, for which the product, modulation×coding_rate, may be 3. Graph 410 shows an exemplary graph of PER versus SNR for 256 QAM modulation and a coding rate of ½, for which the product, modulation×coding_rate, may be 4.

Graph 412 shows an exemplary graph of PER versus SNR for BPSK modulation and a coding rate of ⅔, for which the product, modulation×coding_rate, may be ⅔. Graph 414 shows an exemplary graph of PER versus SNR for QPSK modulation and a coding rate of ⅔, for which the product, modulation×coding_rate, may be 4/3. Graph 416 shows an exemplary graph of PER versus SNR for 16 QAM modulation and a coding rate of ⅔, for which the product, modulation×coding_rate, may be 8/3. Graph 418 shows an exemplary graph of PER versus SNR for 64 QAM modulation and a coding rate of ⅔, for which the product, modulation×coding_rate, may be 4. Graph 420 shows an exemplary graph of PER versus SNR for 256 QAM modulation and a coding rate of ⅔, for which the product, modulation×coding_rate, may be 16/3.

Graph 422 shows an exemplary graph of PER versus SNR for QPSK modulation and a coding rate of ¾, for which the product, modulation×coding_rate, may be 3/2. Graph 424 shows an exemplary graph of PER versus SNR for 16 QAM modulation and a coding rate of ¾, for which the product, modulation×coding_rate, may be 3. Graph 426 shows an exemplary graph of PER versus SNR for 64 QAM modulation and a coding rate of ¾, for which the product, modulation×coding_rate, may be 9/2. Graph 428 shows an exemplary graph of PER versus SNR for 256 QAM modulation and a coding rate of ¾, for which the product, modulation×coding_rate, may be 6.

Graph 430 shows an exemplary graph of PER versus SNR for BPSK modulation and a coding rate of 5/6, for which the product, modulation×coding_rate, may be 5/6. Graph 432 shows an exemplary graph of PER versus SNR for QPSK modulation and a coding rate of 5/6, for which the product, modulation×coding_rate, may be 5/3. Graph 434 shows an exemplary graph of PER versus SNR for 16 QAM modulation and a coding rate of 5/6, for which the product, modulation×coding_rate, may be 10/3. Graph 436 shows an exemplary graph of PER versus SNR for 64 QAM modulation and a coding rate of 5/6, for which the product, modulation× coding_rate, may be 5. Graph 438 shows an exemplary graph of PER versus SNR for 256 QAM modulation and a coding rate of 5/6, for which the product, modulation×coding_rate, may be 20/3.

In operation, with reference to FIG. 4, if the observed SNR is 5 dB for a given spatial mode, and the target PER for the spatial mode is 0.10, or 10%, there may be two possible combinations of modulation and coding rate which satisfy the objective PER as indicated in graph 404, and graph 412. However, the product, modulation×coding_rate, for graph 404 may be 1 while the product may be ⅔ for graph 412. In this exemplary case, a coding rate of ½ with the QPSK modulation technique may provide the maximum data rate for the given spatial mode.

If the observed SNR for another spatial mode is 20 dB, there may be three possible combinations of modulation and coding rate which satisfy the objective PER as indicated in graph 410, graph 418, and graph 434. For graph 410 and graph 418, the product, modulation×coding_rate, may be 4, while the product may be 10/3 for graph 434. Further inspection of FIG. 4 indicates that the PER performance of the 64 QAM modulation technique may be slightly better than that of the 256 QAM modulation technique. In this exemplary case the maximum data rate for the spatial mode may be achieved utilizing a coding rate of ⅔ with the 64 QAM modulation technique.

The exemplary lookup table Mod_Coding_LUT may be determined based on the 1×1 PER performance at the beginning of packet exchange for the first time, or the Mod_Coding_LUT may be stored as a configuration parameter at the receiver. With a larger number of antennas, each spatial mode may have different values in its respective lookup table due to the different fading characteristics per spatial mode. In the case of different fading characteristics per spatial mode, each spatial mode may have a separate stored Mod_Coding_LUT. The per spatial mode Mod_Coding_LUTs may be store in, for example, registers.

The adaptive selection of modulation and coding rates to achieve a maximum data rate for a target PER may also be evidenced in a maximization of throughput in communications between a transmitter 300 and a receiver 301. For selected coding rates and modulation techniques, throughput calculations may be performed which indicate the quantity of error-free information per unit of time which is transmitted from a transmitter 300 to a receiver 301 utilizing a given spatial mode based on observation. For constant data rates, throughput may be defined as:

$$\text{Throughput} = \frac{\text{Successfully Transmitted Data (bits)}}{\text{Time Interval}} \times \text{efficiency} \quad \text{equation [5]}$$

$$= (\text{Data Rates}) \times (1 - PER) \times \text{efficiency} \quad \text{equation [6]}$$

while for variable data rates:

$$\text{Throughput} = \frac{\sum (\text{successful } events_i \times \text{data } rates_i)}{nsamps} \times \text{efficiency} \quad \text{equation [7]}$$

$$= \sum_{i=1}^{K} [rates_i \times (1 - PER_i) \times W_i] \times \text{efficiency} \quad \text{equation [8]}$$

where a successful event may represent successful transmission and reception of an error-free information packet. The variable K may indicate the total number of data rates chosen during the time interval of observation. $W_i$ may be the weighting factor representing the number of packets transmitted at $rate_i$ divided by the total number of packets transmitted. Efficiency may be represented as $t_{data}/(t_{data}+t_{preamble}+t_{IFS})$, with $t_{data}$ representing the amount of time during the time interval during which data was sent, $t_{preamble}$ representing the amount of time during which packet frame preamble was sent, and $t_{IFS}$ represents the inter frame spacing time between packets during which no data or preamble was sent. The computed throughput rate may be based on the coding rate, the modulation technique utilized, and the PER. Since the coding rate and modulation may be based on the SNR, the throughput of a spatial mode may therefore also be based on the SNR. It should be noted that a constant data rate does not preclude adaptive changes in modulation and/or coding rate.

Figure 5:
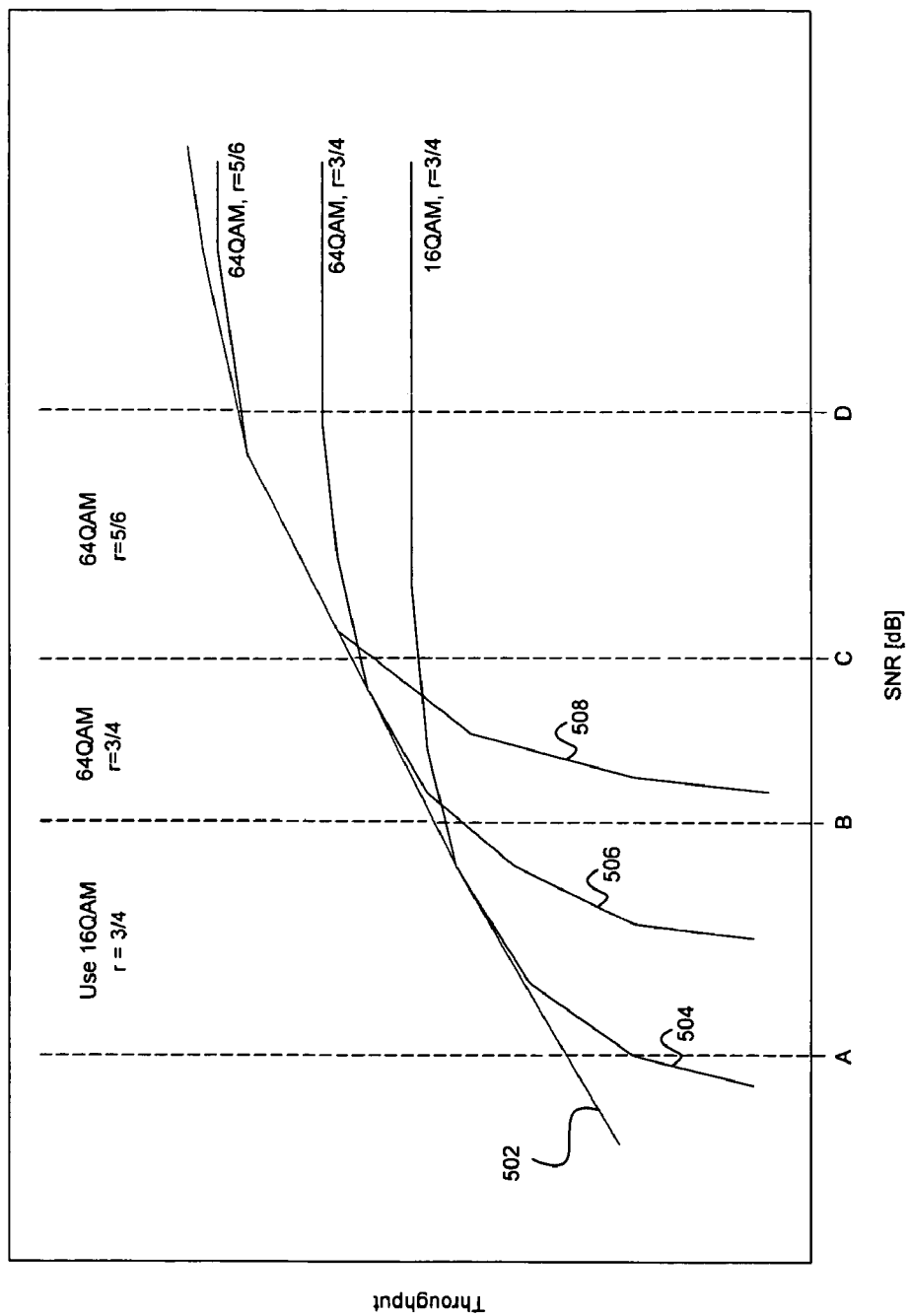
FIG. 5 is a graph illustrating exemplary throughput as a function of modulation and coding rate selection, in accordance with an embodiment of the invention.

FIG. 5 is a graph illustrating exemplary throughput as a function of modulation and coding rate selection, in accordance with an embodiment of the invention. With reference to FIG. 5 is shown graph 502, graph 504, graph 506, and graph 508. Graph 502 represents exemplary throughput versus SNR which may theoretically be achieved in an open loop system utilizing, for example, transmit power control (TPC) management frames as defined in IEEE resolution 802.11. Graph 504, graph 506, and graph 508 may represent exemplary throughput versus SNR for an exemplary adaptive modulation and adaptive coding rate system according to an embodiment of the invention. Graph 504 may represent 16 QAM with a ¾ coding rate, graph 506 may represent 64 QAM with a coding rate of ¾, and graph 508 may represent 64 QAM with ⅚ coding rate. Referring to FIG. 5, for the range SNR=A to SNR=B, the selection of 16 QAM and ¾ coding rate, as illustrated in graph 504, may result a higher throughput than those indicated for graph 506 and graph 508 over the same SNR range. For the range SNR=B to SNR=C, the selection of 64 QAM and a ¾ coding rate, as illustrated in graph 506 may result in a higher throughput than those indicated for graph 504, and graph 508. For the range SNR=C to SNR=D, the selection of 64 QAM and a ⅚ coding rate, as illustrated in graph 508 may result in a higher throughput than those indicated for graph 504, and graph 506.

Figure 6:
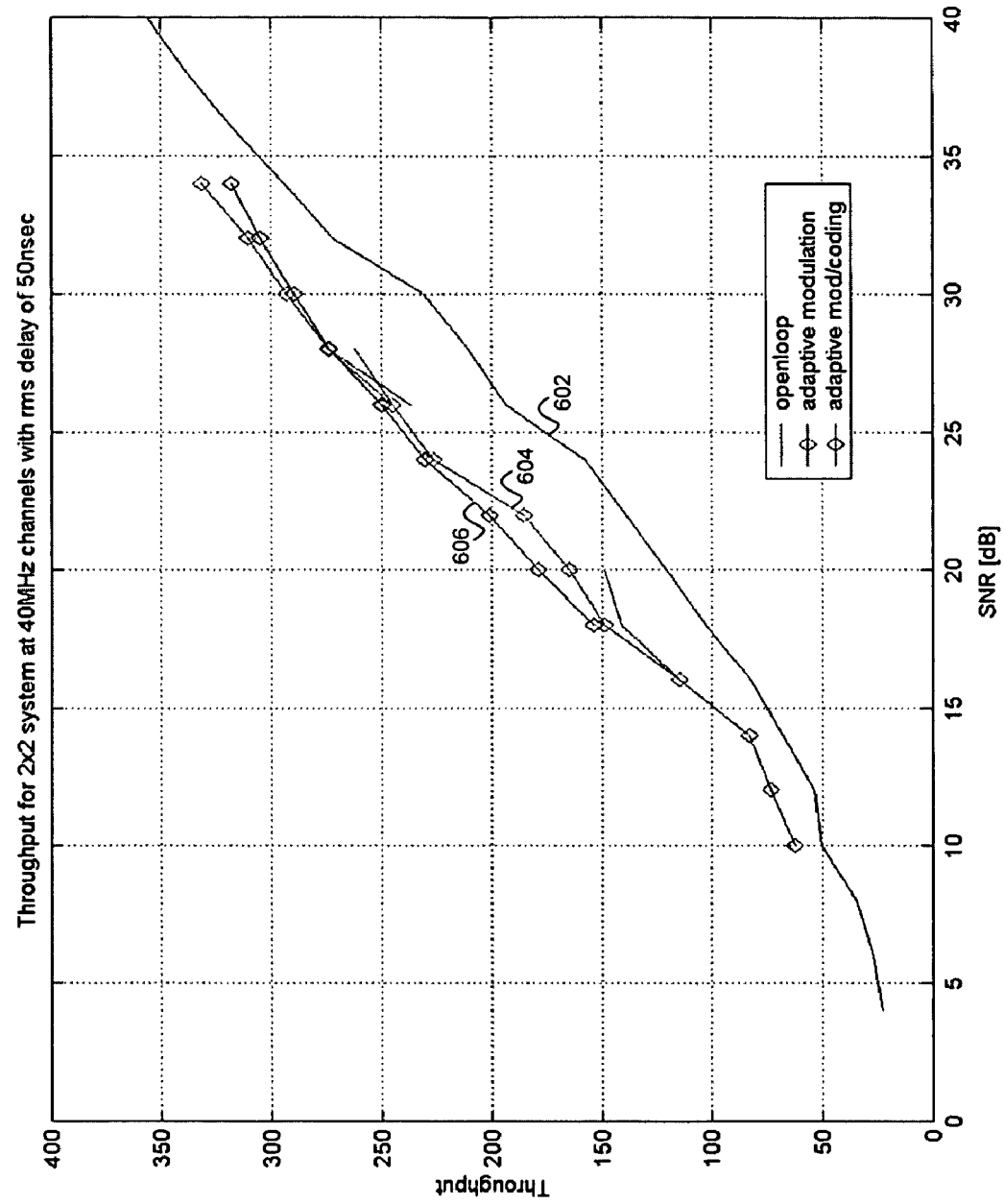
FIG. 6 is a graph illustrating exemplary throughput versus SNR for open loop and adaptive systems, in accordance with an embodiment of the invention.

FIG. 6 is a graph illustrating exemplary throughput versus SNR for open loop and adaptive systems, in accordance with an embodiment of the invention. With reference to FIG. 6 is shown graph 602, graph 604, and graph 606. The system may represent measurements associated with a 2×2 system comprising a transmitter with 2 transmitting antennas and a receiver with two receiving antennas. The system may utilize 40 MHz channels with a root mean squared (RMS) delay spread of 50 nanoseconds. Graph 602 may represent observed values of throughput versus SNR for an open loop system. Graph 604 may represent observed values of throughput versus SNR for a system, such as for example, shown in FIG. 2, utilizing adaptive modulation. Graph 606 may represent observed values of throughput versus SNR for a system, such as for example, shown in FIG. 3, utilizing adaptive modulation and adaptive coding. As shown in FIG. 6, both the adaptive modulation system, and the adaptive modulation and adaptive coding rate systems may result in higher throughput for a given SNR than is the case with the open loop system.

Accordingly, one embodiment of the invention provides a new transmitter 200 or 300 and receiver 201 or 301 architecture, which may utilize either adaptive modulation, as shown in the transmitter 200 and receiver 201, or adaptive modulation and coding in a closed loop system, as shown in the transmitter 300 and receiver 301. The transmitter 200 and receiver 201 utilizing adaptive modulation may possess a simpler structure, comprising a single puncture block/interleaver block pair in the transmitter 200 and a single depuncture block/deinterleaver block pair in the receiver 201, while the transmitter 300 and receiver 301 utilizing adaptive modulation and coding may comprise a puncture block/interleaver block pair per stream in the transmitter 300, and a depuncture block/deinterleaver block pair per stream in the receiver 301. With reference to FIG. 6, an adaptive modulation system, or an adaptive modulation and coding system utilizing Eigen beamforming, may provide a level of throughput comparable to that of an open loop system but at an SNR level which may be 5 dB lower than that which may be required in the open loop system. The adaptive modulation system, and/or the adaptive modulation and coding system may utilize a rate selection algorithm to maximize throughput based on the SNR range in which modulation and coding rates may be adaptively chosen.

Figure 7A:
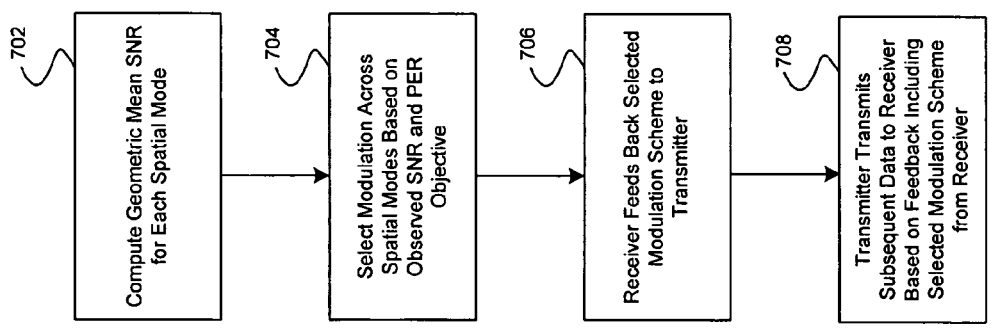
FIG. 7a is a flow chart illustrating exemplary steps for an adaptive coding system, in accordance with an embodiment of the invention.

FIG. 7a is a flow chart illustrating exemplary steps for an adaptive coding system, in accordance with an embodiment of the invention. Referring to FIG. 7a, step 702 may compute a geometric mean SNR for each spatial mode, and step 704 may select a modulation technique across each spatial mode based on the observed SNR and PER objective. In step 706, the receiver 201 may feed back the selected modulation scheme to the transmitter 200. In step 708, the transmitter 200 may transmit subsequent data to the receiver 201 based on feedback information that may include the modulation scheme selected by the receiver 201.

Figure 7B:
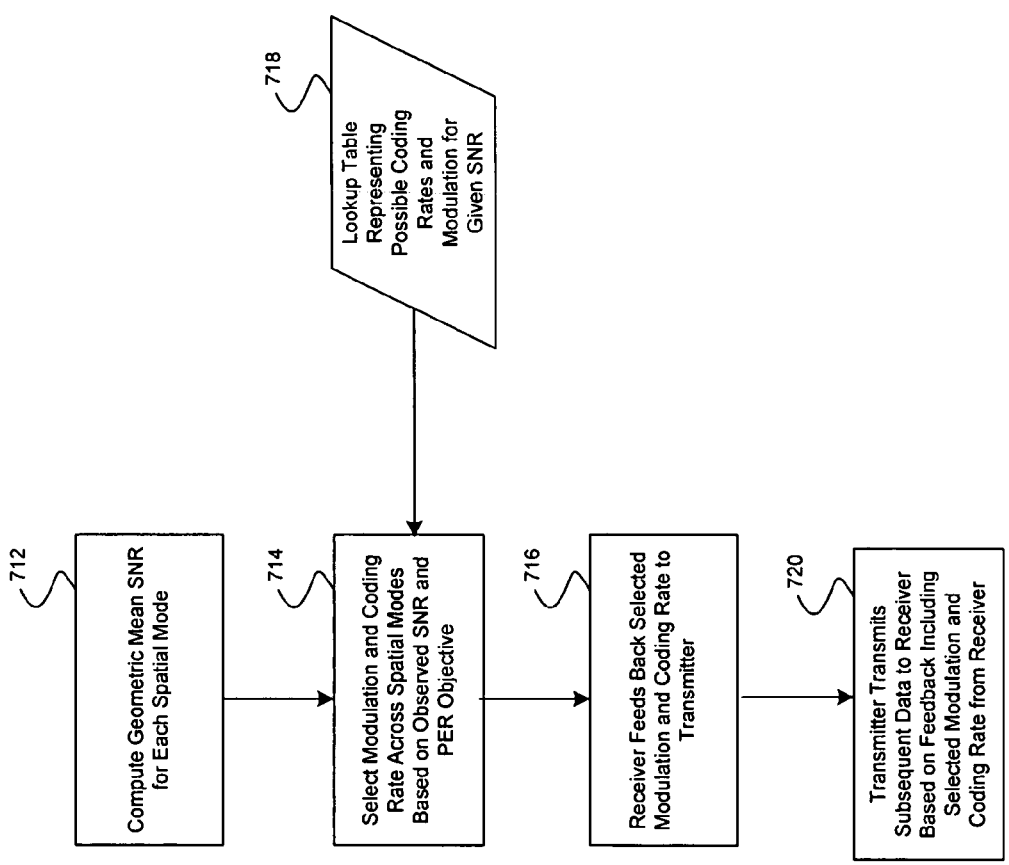
FIG. 7b is a flow chart illustrating exemplary steps for an adaptive modulation and coding system, in accordance with an embodiment of the invention.

FIG. 7b is a flow chart illustrating exemplary steps for an adaptive modulation and coding system, in accordance with an embodiment of the invention. Referring to FIG. 7b, step 712 may compute a geometric mean SNR for each spatial mode, and step 714 may select a modulation technique and coding rate across each spatial mode based on an observed SNR and PER objective. Step 718 may store a lookup table representing possible coding rates and modulation techniques for given SNR ranges. The step 714 may utilize the stored lookup table from step 718. In step 716, the receiver 301 may feed back the selected modulation scheme and coding rate to the transmitter 300. In step 720, the transmitter 300 may transmit subsequent data to the receiver 301 based on feedback information that may include the modulation scheme and coding rate selected by the receiver 301.

Figure 7C:
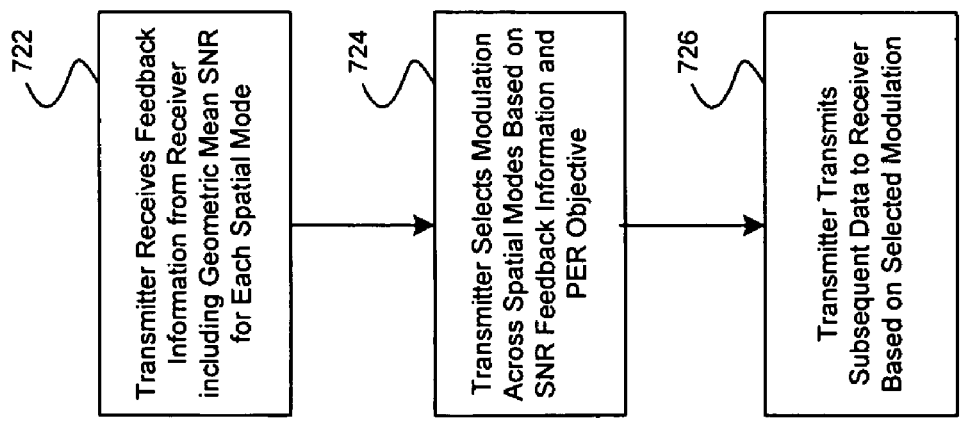
FIG. 7c is a flow chart illustrating exemplary steps for a transmitter-based adaptive coding system, in accordance with an embodiment of the invention.

FIG. 7c is a flow chart illustrating exemplary steps for a transmitter-based adaptive coding system, in accordance with an embodiment of the invention. Referring to FIG. 7c, in step 722 the transmitter 200 may receive feedback information from the receiver 201 comprising geometric mean SNR information for each spatial mode. In step 724, the transmitter 200 may select modulation techniques for each spatial mode based on SNR feedback information and PER objectives. In step 726, the transmitter 200 may transmit subsequent data to the receiver 201 based on the selection modulation techniques.

Figure 7D:
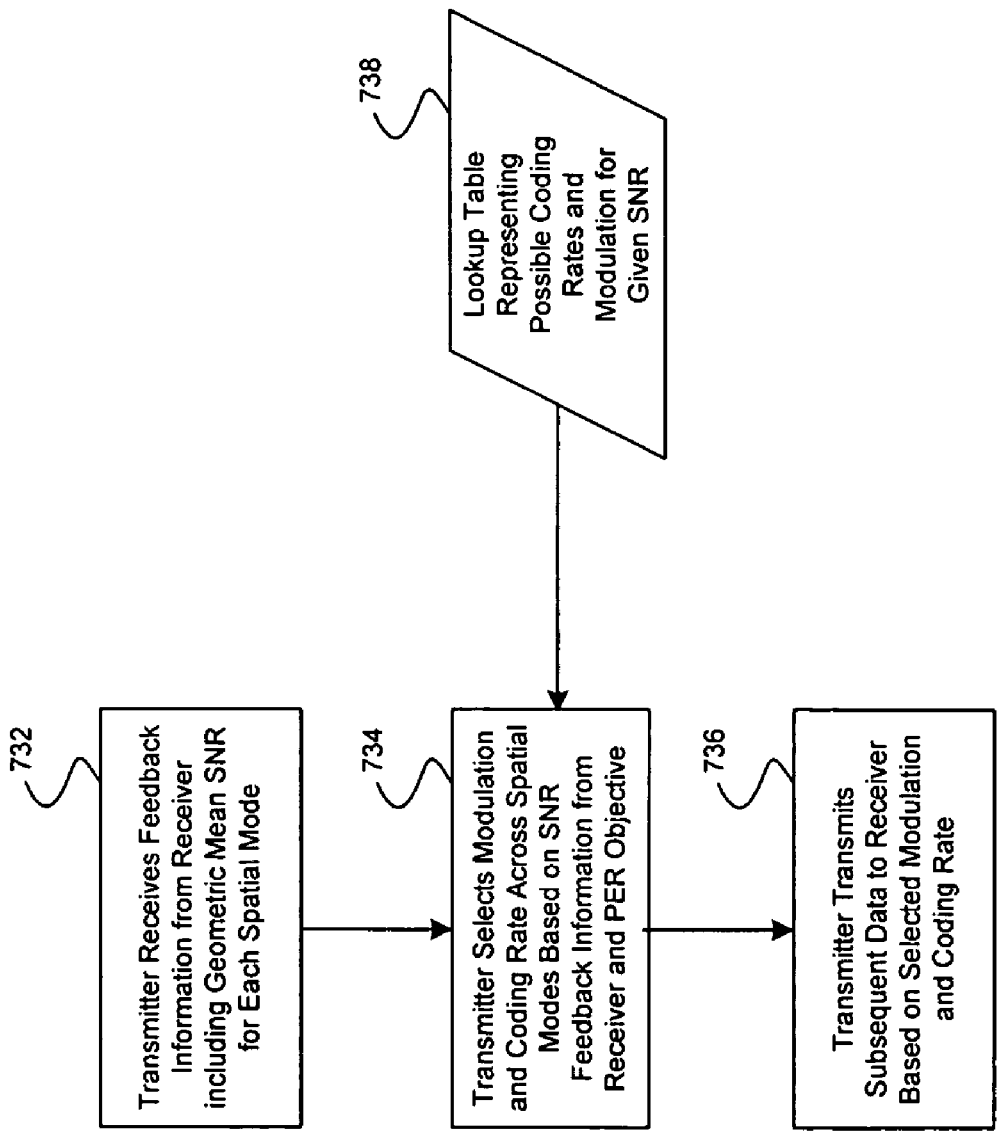
FIG. 7d is a flow chart illustrating exemplary steps for a transmitter-based adaptive modulation and coding system, in accordance with an embodiment of the invention.

FIG. 7d is a flow chart illustrating exemplary steps for a transmitter-based adaptive modulation and coding system, in accordance with an embodiment of the invention. Referring to FIG. 7d, in step 732 the transmitter 300 may receive feedback information from the receiver 301 comprising geometric mean SNR information for each spatial mode. In step 734, the transmitter 300 may select modulation techniques and coding rates for each spatial mode based on SNR feedback information and PER objectives. Step 738 may store a lookup table representing possible coding rates and modulation techniques for given SNR ranges. The step 734 may utilize the stored lookup table from step 738. In step 736, the transmitter 300 may transmit subsequent data to the receiver 301 based on the selection modulation techniques and coding rates.

Embodiments of the invention are not limited to adaptive selection of modulation and coding based on the Mod_Coding_LUT as shown in equation [4]. In general, the invention may represent a method and a system for computing a range of modulation and coding rate combinations which may be utilized to adaptively determine a maximum data rate which may be obtained in a spatial mode based on observable characteristics of an RF channel, such as for example, SNR, and that meet observable performance criteria, such as for example, PER.

Embodiments of the invention are not limited to cases in which the receiver 201 or 301 adaptively determines modulation techniques and coding rates. Furthermore, the invention may not be limited to BCC, as a plurality of other coding techniques such as, for example, Turbo coding, or low density parity check (LDPC) coding may also be utilized. In certain embodiments of the invention the transmitter 200 or 300 may adaptively determine modulation techniques and coding rates based on feedback information from the receiver 201 or 301. This feedback information may comprise, for example, channel estimate matrices computed by the receiver 201 or 301.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communication system, the method comprising:
    computing a maximum number of binary bits to be concurrently transmitted via at least one of a plurality of downlink RF channels based on one or more computed geometric mean signal quality values for said at least one of said plurality of downlink RF channels, wherein a plurality of signal quality values is computed for each of said plurality of downlink RF channels;
    selecting at least one modulation technique based on said computed maximum number of binary bits;
    communicating, via at least one of a plurality of uplink RF channels, feedback information comprising one or both of: said selected said at least one modulation technique and said one or more computed geometric mean signal quality values; and
    receiving, via said at least one of said plurality of downlink RF channels, subsequently transmitted data that utilizes a downlink modulation type, wherein said downlink modulation type is said selected at least one modulation technique and/or is based on said feedback information.

2. The method according to claim 1, comprising determining a plurality of modulation technique and coding rate combinations based on a plurality of signal to noise ratio values.

3. The method according to claim 2, comprising representing said plurality of modulation technique and coding rate combinations and said plurality of signal to noise ratio values in a lookup table.

4. The method according to claim 2, comprising selecting said at least one modulation technique and a corresponding coding rate from said plurality of modulation type and coding rate combinations based on one or more packet error rate values.

5. The method according to claim 4, comprising communicating said feedback information comprising said selected at least one modulation technique and said corresponding coding rate.

6. The method according to claim 1, comprising computing each of said one or more computed geometric mean signal quality values based on a multiplicative product of a plurality of signal to noise ratios, wherein each of said plurality of signal to noise ratios is observed in connection with a corresponding distinct frequency within a frequency bandwidth of said at least one of said plurality of downlink RF channels.

7. A system for communicating information in a communication system, the system comprising:
    one or more circuits that enable computation of a maximum number of binary bits to be concurrently transmitted via at least one of a plurality of downlink RF channels based on one or more computed geometric mean signal quality values for said at least one of said plurality of downlink RF channels, wherein a plurality of signal quality values is computed for each of said plurality of downlink RF channels;
    said one or more circuits enable selection of at least one modulation technique based on said computed maximum number of binary bits;
    said one or more circuits enable communication, via at least one of a plurality of uplink RF channels, of feedback information comprising one or both of: said selected said at least one modulation technique and said one or more computed geometric mean signal quality values; and
    said one or more circuits enable reception, via said at least one of said plurality of downlink RF channels, of subsequently transmitted data that utilizes a downlink modulation type, wherein said downlink modulation type is said selected at least one modulation technique and/or is based on said feedback information.

8. The system according to claim 7, wherein said one or more circuits enable determination of a plurality of modulation technique and coding rate combinations based on a plurality of signal to noise ratio values.

9. The system according to claim 8, wherein said one or more circuits enable representation of said plurality of modulation technique and coding rate combinations and said plurality of signal to noise ratio values in a lookup table.

10. The system according to claim 8, wherein said one or more circuits enable selection of said at least one modulation technique and a corresponding coding rate from said plurality of modulation type and coding rate combinations based on one or more packet error rate values.

11. The system according to claim 10, wherein said one or more circuits enable communication of said feedback information comprising said selected at least one modulation technique and said corresponding coding rate.

12. The system according to claim 7, wherein said one or more circuits enable computation of each of said one or more geometric mean signal quality values based on a multiplicative product of a plurality of signal to noise ratios, wherein each of said plurality of signal to noise ratios is observed in connection with a corresponding distinct frequency within a frequency bandwidth of said at least one of said plurality of downlink RF channels.

13. A method for communicating information in a multiple input multiple output communication system, the method comprising:

receiving, via one or more uplink RF channels, feedback information comprising one or more geometric mean signal quality values;

selecting a modulation technique and/or coding rate based on each of said one or more geometric mean signal quality values; and transmitting, via at least one of a plurality of downlink RF channels, subsequent data utilizing said selected one or more modulation techniques and/or coding rates, wherein each of said plurality of downlink RF channels enable computation of a plurality of signal quality values, and said computed plurality of signal quality values enable generation of one or more subsequently received geometric mean signal quality values.

14. The method according to claim 13, wherein said selected one or more modulation techniques and/or codinq rates is utilized for each distinct frequency within a frequency bandwidth for said at least one of said plurality of downlink RF channels.

15. The method according to claim 13, comprising selecting said one or more modulation techniques and/or coding rates based on at least one or more of: a computed maximum number of binary bits to be concurrently transmitted via said at least one of said plurality of downlink RF channels, at least one packet error rate and at least one throughput rate.

16. The method according to claim 13, comprising determining a plurality of modulation technique and coding rate combinations based on one or more of a plurality of signal to noise ratio values, at least one packet error rate and at least one computed throughput rate.

17. The method according to claim 16, comprising selecting said modulation technique and/or coding rate from said plurality of modulation technique and coding rate combinations based on said one or more geometric mean signal quality values.

18. A system for communicating information in a multiple input multiple output communication system, the system comprising:

one or more circuits that enable reception, via one of one or more uplink RF channels, of feedback information comprising one or more geometric mean signal quality values;

said one or more circuits enable selection of a modulation technique and/or coding rate based on each of said one or more geometric mean signal quality values; and said one or more circuits enable transmission, via a plurality of downlink RF channels, subsequent data utilizing said selected one or more modulation techniques and/or coding rates, wherein each of said plurality of downlink RF channels enable computation of a plurality of signal quality values, and said computed plurality of signal quality values enable generation of one or more subsequently received geometric mean signal quality values.

19. The system according to claim 18, wherein said selected one or more modulation techniques and/or coding rates is utilized for each distinct frequency within a frequency bandwidth for said at least one of said plurality of downlink RF channels.

20. The system according to claim 18, wherein said one or more circuits enable selection of said one or more modulation techniques and/or coding rates based on one or more of: a computed maximum number of binary bits to be concurrently transmitted via said at least one of said plurality of downlink RF channels, at least one packet error rate and/or at least one throughput rate.

21. The system according to claim 18, wherein said one or more circuits enable determination of a plurality of modulation technique and coding rate combinations based on one or more of a plurality of signal to noise ratio values, at least one packet error rate and at least one computed throughput rate.

22. The system according to claim 21, wherein said one or more circuits enable selection of said modulation technique and/or coding rate from said plurality of modulation technique and coding rate combinations based on said one or more geometric mean signal quality values.

* * * * *